United States Patent
Cronin et al.

(10) Patent No.: US 9,498,678 B2
(45) Date of Patent: Nov. 22, 2016

(54) BALL TRACKER CAMERA

(71) Applicant: ProSports Technologies, LLC, Miami, FL (US)

(72) Inventors: John Cronin, Bonita Springs, FL (US); Nicholas Reasner, Miami, FL (US)

(73) Assignee: ProSports Technologies, LLC, Miami, FL (US)

( * ) Notice: Subject to any disclaimer, the term of this patent is extended or adjusted under 35 U.S.C. 154(b) by 0 days.

(21) Appl. No.: 14/798,314

(22) Filed: Jul. 13, 2015

(65) Prior Publication Data

US 2016/0008662 A1   Jan. 14, 2016

Related U.S. Application Data

(60) Provisional application No. 62/023,400, filed on Jul. 11, 2014.

(51) Int. Cl.
| | |
|---|---|
| H04N 5/225 | (2006.01) |
| A63B 24/00 | (2006.01) |
| G06T 7/20 | (2006.01) |
| H04N 5/232 | (2006.01) |

(52) U.S. Cl.
CPC ........... *A63B 24/0021* (2013.01); *G06T 7/204* (2013.01); *G06T 7/2093* (2013.01); *H04N 5/232* (2013.01); *A63B 2024/0034* (2013.01); *G06T 2207/30221* (2013.01); *G06T 2207/30224* (2013.01)

(58) Field of Classification Search
USPC ......................................................... 348/169
See application file for complete search history.

(56) References Cited

U.S. PATENT DOCUMENTS

| | | | |
|---|---|---|---|
| 6,144,375 A | 11/2000 | Jain et al. | |
| 6,204,813 B1 | 3/2001 | Wadell et al. | |
| 6,952,558 B2 | 10/2005 | Hardacker | |
| 7,079,176 B1 | 7/2006 | Freeman et al. | |
| 7,091,863 B2 | 8/2006 | Ravet | |
| 7,136,042 B2 | 11/2006 | Magendanz et al. | |
| 7,383,229 B2 | 6/2008 | Jacoby | |
| 7,583,901 B2 | 9/2009 | Nakagawa et al. | |

(Continued)

FOREIGN PATENT DOCUMENTS

| | | |
|---|---|---|
| CN | 102843186 | 12/2012 |
| EP | 2 150 057 | 12/2013 |

(Continued)

OTHER PUBLICATIONS

U.S. Appl. No. 14/798,271, John E. Cronin, Event-Based Content Collection for Network-Based Distribution, filed Jul. 13, 2015.

(Continued)

*Primary Examiner* — Roberto Velez
*Assistant Examiner* — Stephen Coleman
(74) *Attorney, Agent, or Firm* — Polsinelli LLP

(57) ABSTRACT

Systems and methods for ball tracking are provided. An identification processor may be coupled to a ball and may generate wireless signals as the ball is moving. At least three triangulation antennas may be distributed at different locations within an event venue. Such triangulation antennas may receive the wireless signals from the identification processor in real-time. Such signals may be used to determine a real-time location of the ball within the event venue. A controller may then adjust a gimbal to point the camera at the determined real-time location of the ball.

16 Claims, 5 Drawing Sheets

(56) References Cited

U.S. PATENT DOCUMENTS

| | | |
|---|---|---|
| 7,620,426 B2 | 11/2009 | Ortiz et al. |
| 7,715,723 B2 | 5/2010 | Kagawa et al. |
| 7,721,339 B2 | 5/2010 | Madison et al. |
| 7,734,730 B2 | 6/2010 | McCanne |
| 7,743,070 B1 | 6/2010 | Blumberg |
| 7,849,160 B2 | 12/2010 | Hayward |
| 7,884,855 B2 | 2/2011 | Ortiz |
| 8,019,227 B2 | 9/2011 | Iizuka |
| 8,091,111 B2 | 1/2012 | Logan et al. |
| 8,237,787 B2 | 8/2012 | Hollinger |
| 8,279,051 B2 | 10/2012 | Khan |
| 8,333,321 B2 | 12/2012 | Gressel et al. |
| 8,391,773 B2 | 3/2013 | Arseneau et al. |
| 8,408,553 B2 | 4/2013 | Eskildsen |
| 8,482,612 B2 | 7/2013 | Tamir et al. |
| 8,526,931 B1 | 9/2013 | Fraley |
| 8,538,276 B2 | 9/2013 | Shimada et al. |
| 8,588,432 B1 | 11/2013 | Simon |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,622,832 B2 | 1/2014 | Marty et al. |
| 8,626,465 B2 | 1/2014 | Moore et al. |
| 8,630,216 B2 | 1/2014 | Deivasigamani et al. |
| 8,638,367 B1 | 1/2014 | Allen |
| 8,660,501 B2 | 2/2014 | Sanguinetti |
| 8,706,044 B2 | 4/2014 | Chang et al. |
| 8,724,723 B2 | 5/2014 | Panicker et al. |
| 8,736,681 B2 | 5/2014 | Matsuzawa |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,124,729 B2 | 9/2015 | Jung et al. |
| 2002/0132612 A1 | 9/2002 | Ishii |
| 2002/0156835 A1 | 10/2002 | Williams et al. |
| 2003/0023595 A1 | 1/2003 | Carbom et al. |
| 2004/0071209 A1 | 4/2004 | Burg et al. |
| 2004/0086257 A1 | 5/2004 | Werberig et al. |
| 2005/0012023 A1 | 1/2005 | Vock et al. |
| 2005/0093976 A1 | 5/2005 | Valleriano et al. |
| 2005/0202905 A1 | 9/2005 | Chesser |
| 2005/0273830 A1 | 12/2005 | Silver et al. |
| 2006/0067654 A1 | 3/2006 | Herberger et al. |
| 2007/0188611 A1 | 8/2007 | Carter |
| 2007/0188612 A1 | 8/2007 | Carter |
| 2007/0200929 A1 | 8/2007 | Conaway |
| 2008/0137507 A1 | 6/2008 | Sun et al. |
| 2008/0140233 A1 | 6/2008 | Seacat |
| 2008/0192116 A1 | 8/2008 | Tamir et al. |
| 2009/0061971 A1 | 3/2009 | Weitzner et al. |
| 2009/0082110 A1 | 3/2009 | Relyea et al. |
| 2009/0171571 A1 | 7/2009 | Son et al. |
| 2010/0026809 A1 | 2/2010 | Curry |
| 2010/0043040 A1 | 2/2010 | Olsen |
| 2010/0245588 A1 | 9/2010 | Waehner et al. |
| 2010/0306064 A1 | 12/2010 | Inselburg |
| 2011/0050904 A1 | 3/2011 | Anderson |
| 2011/0165946 A1 | 7/2011 | Pavlich et al. |
| 2011/0202945 A1 | 8/2011 | Pickelsimer et al. |
| 2011/0280540 A1 | 11/2011 | Woodman |
| 2011/0304737 A1 | 12/2011 | Evans et al. |
| 2012/0052949 A1 | 3/2012 | Weitzner et al. |
| 2012/0054178 A1 | 3/2012 | Tran et al. |
| 2012/0188345 A1 | 7/2012 | Salow |
| 2012/0229338 A2 | 9/2012 | Eidloth et al. |
| 2012/0317302 A1 | 12/2012 | Silvestri et al. |
| 2013/0126713 A1 | 5/2013 | Haas et al. |
| 2013/0141555 A1 | 6/2013 | Ganick et al. |
| 2013/0160051 A1 | 6/2013 | Armsrong et al. |
| 2013/0182117 A1 | 7/2013 | Arseneau et al. |
| 2013/0196788 A1 | 8/2013 | Shimizu et al. |
| 2013/0205341 A1 | 8/2013 | Jabara et al. |
| 2013/0268620 A1 | 10/2013 | Osminer |
| 2013/0279917 A1 | 10/2013 | Son et al. |
| 2013/0283305 A1 | 10/2013 | Hirsch et al. |
| 2013/0286212 A1 | 10/2013 | Sandler et al. |
| 2013/0300832 A1 | 11/2013 | Hohteri et al. |
| 2013/0303192 A1 | 11/2013 | Louboutin |
| 2013/0305297 A1 | 11/2013 | Jabara et al. |
| 2013/0317835 A1 | 11/2013 | Mathew |
| 2013/0328917 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335520 A1 | 12/2013 | Campbell et al. |
| 2013/0336662 A1 | 12/2013 | Murayama et al. |
| 2013/0343762 A1 | 12/2013 | Murayama et al. |
| 2014/0031058 A1 | 1/2014 | Zhang et al. |
| 2014/0057658 A1 | 2/2014 | Murad et al. |
| 2014/0062773 A1 | 3/2014 | MacGougan |
| 2014/0063259 A1 | 3/2014 | Rhodes et al. |
| 2014/0065962 A1 | 3/2014 | Le |
| 2014/0071221 A1 | 3/2014 | Dave |
| 2014/0072270 A1 | 3/2014 | Goldberg et al. |
| 2014/0105084 A1 | 4/2014 | Chhabra |
| 2014/0111625 A1 | 4/2014 | Dawe et al. |
| 2014/0139380 A1 | 5/2014 | Ouyang |
| 2014/0141803 A1 | 5/2014 | Marti |
| 2014/0150042 A1 | 5/2014 | Pacor et al. |
| 2014/0161416 A1 | 6/2014 | Chou et al. |
| 2014/0162628 A1 | 6/2014 | Bevelacqua |
| 2014/0164520 A1 | 6/2014 | Fan |
| 2014/0164760 A1 | 6/2014 | Hybertson |
| 2014/0167794 A1 | 6/2014 | Nath |
| 2014/0168170 A1 | 6/2014 | Lazarescu |
| 2014/0171039 A1 | 6/2014 | Bjontegard |
| 2014/0171114 A1 | 6/2014 | Marti |
| 2014/0180820 A1 | 6/2014 | Louboutin |
| 2014/0191979 A1 | 7/2014 | Tsudik |
| 2014/0195675 A1 | 7/2014 | Silver |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0349750 A1 | 11/2014 | Thompson et al. |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0006648 A1 | 1/2015 | Cao |
| 2015/0011242 A1 | 1/2015 | Nagaraj |
| 2015/0026623 A1 | 1/2015 | Horne |
| 2015/0031397 A1 | 1/2015 | Jouaux |
| 2015/0326902 A1 | 11/2015 | Levakov et al. |

FOREIGN PATENT DOCUMENTS

| | | |
|---|---|---|
| WO | WO 01/41884 | 6/2001 |
| WO | WO 2004/071598 | 8/2004 |
| WO | WO 2007/035878 A2 | 3/2007 |
| WO | WO 2007/035878 A3 | 3/2007 |
| WO | WO 2009/104921 | 8/2009 |
| WO | WO 2011/137100 | 11/2011 |
| WO | WO 2013/121215 | 8/2013 |

(56) References Cited

FOREIGN PATENT DOCUMENTS

| WO | PCT/US15/40207 | 7/2015 |
|----|----------------|--------|
| WO | PCT/US15/40215 | 7/2015 |
| WO | PCT/US15/40223 | 7/2015 |
| WO | PCT/US15/47148 | 8/2015 |
| WO | PCT/US15/47265 | 8/2015 |
| WO | WO 2016/007962 | 1/2016 |
| WO | WO 2016/007967 | 1/2016 |

OTHER PUBLICATIONS

U.S. Appl. No. 14/798,286, John Cronin, Camera Feed Distribution from Event Venue Virtual Seat Cameras, filed Jul. 13, 2015.
U.S. Appl. No. 14/788,748, John Cronin, Sports Television Application, filed Jun. 30, 2015.
U.S. Appl. No. 14/798,346, John Cronin, Ball Tracker Snippets, filed Jul. 13, 2015.
U.S. Appl. No. 14/798,294, John Cronin, Event Data Transmission to Eventgoer Devices, filed Jul. 13, 2015.
U.S. Appl. No. 14/798,296, John Cronin, Event and Fantasy League Data Transmission to Eventgoer Devices, filed Jul. 13, 2015.
U.S. Appl. No. 14/837,457, John E. Cronin, Multiple Display Controller System, filed Aug. 27, 2015.
U.S. Appl. No. 14/838,767, John E. Cronin, Automated Clip Creation, filed Aug. 28, 2015.
U.S. Appl. No. 14/829,184, Maxx T. Garrison, Event Media, filed Aug. 18, 2015.
U.S. Appl. No. 14/838,129, John E. Cronin, Current Event and Outside Event Data Transmission to Eventgoer Devices, filed Aug. 27, 2015.
"Anvato Announces New Cloud Solution for HD Live Streaming, Clip Editing, Social Sharing and Archival", Anvato Knows/Video, May 12, 2014.
"Aspera to Showcase Digital Media Workflow And Broadcast IT Solutions At Broadcastasia 2013", Aspera News, Jun. 4, 2013.
Barney et al., Casey; "Visible Light Communication Systems", A Major Qualifying Project Report Submitted to the Faculty of the Worchester Polytechnic Institute, Mar. 28, 2014.
"Bright Leverages Cloud to Stream Sports Content Worldwide", by Sports Video Group, Jul. 9, 2013.
"Casio Unveils Prototype of Visible Light Communication System Using Smartphones at CES", Casio Computer Co., Ltd., Jan. 10, 2012.
"Camera Corps Robotic Cameras Systems to Televise Wimbledon Action", TVTechnology, Jun. 24, 2013. http://www.tvtechnology.com/equipment/0082/camera-corps-ro . . . .
"Cisco Stadium Vision Mobile", Cisco, May 21, 2014.
Coxworth, Ben; "NFL may track footballs using magnetic fields", Gizmag.com, Jun. 13, 2014 http://www.gizmag.com/football-tracking-magnetic-fields/3254 . . . .
"Create Innovative SERVICES with PLAY APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Davies, Chris; "Philips LED lights flicker out a challenge to iBeacon and Gimbal", SlashGear, Feb. 17, 2014.
Dawson, Keith; "LiFi in the Real World" All LED Lighting—Illuminating The Led Community, Jul. 31, 2013.
Dinh et al., Thang; "Real time tracking using an active pan-tilt-zoom network camera", Proceeding IROS '09 Proceedings of the 2009 IEEE/RSJ International conference on Intelligent robots and systems. pp. 3786-3793, 2009.
"Engaged Sports Media Selects thePlatform as Centralized Cloud-based Video Publishing System", thePlatform, Oct. 31, 2013.
"EZ Display and EZ Remote for Android—User Guide", InFocus, Jul. 10, 2013.

Fisher et al., Brian E.; "Measurements corner: Three-dimensional position and orientation measurements using magneto-quasistatic fields and complex image theory", IEEE Xplore Abstract, Antennas and Propagation Magazines, IEEE (vol. 56, Iss. 1) Feb. 2014, pp. 160-173.
"Football camera provides ball's-eye view of the field", R&D Magazine Webcast, Feb. 27, 2013.
Gaddam et al., Vamsidhar R.; "Interactive Zoom and Panning from Live Panoramic Video", Nossdav '14 Proceedings of Network and Operating Systems Support for Digital Audio and Video Workshop, Mar. 19, 2014.
Gerhardt, Ryan; "Stadium App Lets Fans Order Food and Get On-Court Close Ups", PSFK.com, Feb. 22, 2013.
"GigaBroadcasting", Li-Fi Consortium, Date of Download: Aug. 14, 2014.
Gilpin, Lyndsey; "How GE created smart lights by integrating beacons into LEDs", TechRepublic, Jun. 6, 2014.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Hammond, Teena; "Stadiums race to digitize: How sports teams are scrambling to keep Millenials coming to games", TechRepublic. Apr. 12, 2014.
"Hybrid's Sport Track Enables Robotic Cameras to Follow Action", TVTechnology, May 29, 2013 http://www.tvtechnology.com/news/0086/hybrids-sport-track-en . . . .
Jaffe, Jay; "MLB unveils revolutionary next-level tracking technology on defense", The Strike Zone, Mar. 3, 2014.
Kamenetzky, Andy; "Inside the Most Connected Sports Venue in America (And, No, It Ain't Cowboys Stadium)", Digital Trends, Nov. 6, 2013.
Kaplan, Daniel; "In-game locker room video still rare around NFL", SportsBusiness Journal, Sep. 30, 2013.
Kappeler et al., Uwe-Philipp; "3D Object Localizationi via Stereo Vision using an Omnidirectional and a Perspective Camera", Proceedings of the 2nd. Workshop on Omnidirectional Robot Vision. May 7, 2010. ISBN 978-88-95872-02-5 pp. 7-12.
Keith Price Bibliography Sports, Line Judge, Ball Position, Ball Tracking and Enhanced Displays, VisionBib. Date of download: Apr. 24, 2014 http://www.visionbib.com/bibliography/motion-f746ba1.html.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Lavars, Nick; "Adidas miCoach Smart Ball tracks your striking power and finesse", Gizmag.com, May 28, 2014 http://www.gizmag.com/adidas-micoach-smart-soccer-ball/3228 . . . .
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
"Manchester City's Etihad Stadium is soon to be transformed into the Premier League's most technologically fan-friendly stadium", Machester City, May 8, 2013.
Montero, Eric, "Design and Implementation of Color-Shift Keying for Visible Light Communications", Sep. 2013, McMaster University.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consortium (VLCC), Apr. 26, 2012.
Pawate et al., Raj; "Remote display technology enhances the cloud's user experience", Texas Instruments, Aug. 2012.

(56) References Cited

OTHER PUBLICATIONS

Pingali et al., Gopal' "Lucentivision: Converting Real World Events into Multimedia Experiences", Multimedia and Expo, 2000. ICME 2000. 2000 IEEE International Conference on vol. 3, Jul. 30, 2000-Aug. 2, 2000.
Povey, Gordon, "VLC for Location, positioning and navigation", Jul. 27, 2011, http://visiblelightcomm.com/vlc-for-location-positioning-and-n . . . .
"Proprietary Data is Foundational", Contextual Database| Delivery Agent, Inc. Date of Download: Apr. 30, 2014 http://www.deliveryagent.com/products/contextual-database/.
RedFIR Precision Real-Time Tracking, Fraunhofer Institute for Integrated Circuits IIS. Oct. 7, 2015.
Ren et al., Jinchang; "A General Framework for 3D Soccer Ball Estimation and Tracking", Image Processing, 2004. ICIP '04. 2004 International Conference on (vol. 3) Date of Conference: Oct. 24-27, 2004.
Rufo et al., J.; "Visible Light Communication Systems for Optical Video Transmission", Microwave and Optical Technology Letters, vol. 52, No. 7, Jul. 2010.
"Streaming Video Online Databases", MLibrary, University of Michigan. Maintained by: Clara Slavens, last modified: Apr. 17, 2014.
"Surveillance Monitoring—Networking Security—PTZ Network Cameras", Panasonic USA. http://www.panasonic.com/business/psna/products-surveillance-monitoring/network-security-cameras/ptz-cameras.aspx Date of Download: Apr. 29, 2014.
Swedberg, Claire; "RFID Helps Soccer Teams Keep their Eye On the Ball, and Their Players", RFID Journal, Mar. 13, 2012.
Thanigavel, M.; "Li-Fi Technology in Wireless Communication", International Journal of Engineering Research & Technology (IJERT), ISSN: 2278-0181, vol. 2 Issue 10, Oct. 2013.
Wells, Alton; "How would you build a gimball system that could track any point within a 360 degree "sphere"", AskEngineers. Posted on Aug. 26, 2013.
Wiedeman, Reeves; "Sporting Kansas City Makes the Stadium More Like Your Couch", BloombergBusinessweek, Jul. 18, 2013.
Woodward, Alexander; Delmas, Patrice; "Computer Vision for Low Cost 3-D Golf Ball and Club Tracking", CITR, University of Auckland, Dept. Computer Science, New Zealand.Date of Download: Apr. 29, 2014.
Won, Eun Tae; "Visible Light Communication: Tutorial", Project: IEEE P802.15 Working Group for Wireless Personal Area Networks (WPANs), Mar. 9, 2008.
"World Cup 2014: Goalline technology TV process reviewed", BBC Sport, Jun. 16, 2014. http://www.bbc.com/sport/0/football/27864393.
Yan, Fei; "Tennis Ball Tracking for Automatic Annotation of Broadcast Tennis Video", Centre for Vision, Speech and Signal Processing, School of Electronics and Physical Sciences, Jun. 2007.
Yu, Shuang; "Automatic Basketball Tracking in Broadcast Basketball Video", A Thesis submitted in partial fulfillment of the requirements for the Degree of Master of Science in The Faculty of Graduate Studies. Aug. 2012.
PCT Application No. PCT/US2015/033613 International Search Report and Written Opinion mailed Sep. 1, 2015.
PCT Application No. PCT/US2015/040207 International Search Report and Written Opinion mailed Oct. 5, 2015.
PCT Application No. PCT/US2015/040215 International Search Report and Written Opinion mailed Sep. 29, 2015.
PCT Application No. PCT/US2015/040223 International Search Report and Written Opinion mailed Oct. 1, 2015.
U.S. Appl. No. 14/798,271, Office Action mailed Nov. 2, 2015.
U.S. Appl. No. 14/788,748 Office Action mailed Nov. 5, 2015.
U.S. Appl. No. 14/798,294 Office Action mailed Nov. 2, 2015.
U.S. Appl. No. 14/838,129 Office Action mailed Oct. 29, 2015.
PCT Application No. PCT/US2015/047148 International Search Report and Written Opinion mailed Dec. 17, 2015.
PCT Application No. PCT/US2015/047265 International Search Report and Written Opinion mailed Dec. 7, 2015.
U.S. Appl. No. 14/798,286 Office Action mailed Dec. 4, 2015.
U.S. Appl. No. 14/798,346 Office Action mailed Dec. 18, 2015.
U.S. Appl. No. 14/829,184 Office Action mailed Nov. 23, 2015.
U.S. Appl. No. 14/798,286 Final Office Action mailed Jun. 8, 2016.
U.S. Appl. No. 14/788,748 Final Office Action mailed May 26, 2016.
U.S. Appl. No. 14/798,346 Final Office Action mailed Jun. 30, 2016.
U.S. Appl. No. 14/798,294 Final Office Action mailed May 13, 2016.
U.S. Appl. No. 14/838,129 Final Office Action mailed Jun. 10, 2016.

BALL TRACKER CAMERA

CROSS-REFERENCE TO RELATED APPLICATIONS

The present patent application claims the priority benefit of U.S. provisional patent application 62/023,400 filed Jul. 11, 2014 and titled "NFL-0007 Ball Tracker Camera," the disclosure of which is incorporated by reference herein.

BACKGROUND OF THE INVENTION

1. Field of the Invention

The present invention generally relates to camera control. More specifically, the present invention relates to ball tracker camera control.

2. Description of the Related Art

Many events may be filmed for live (e.g., real-time) or recorded broadcast. Such events may include a variety of athletic and sporting events involving such equipment as balls, bats, pucks, etc. As the outcome of such athletic and sporting events depends on actions involving such equipment (e.g., a football), a camera (or multiple cameras) may often follow the ball as it is moving during the course of the event. Each such camera is generally controlled by a cameraperson who adjusts the focus and position of the camera as necessary to follow a moving ball.

There may be instances where a cameraperson may lose track of the ball (or other type of equipment). For example, the game may be moving very quickly, or the athletes may be executing a play that involves misdirection. In such instances, the camera may be unable to capture the current state of the ball, resulting in gaps in the action of the event. Audiences—both those viewing remotely and those present in-person, but may be relying on the camera for close-ups—may then become unhappy or dissatisfied as a result of being unable to view the entirety of the event.

There is, therefore, a need in the art for improved systems and methods for improved system and methods of managing smart tickets.

SUMMARY OF THE CLAIMED INVENTION

Embodiments of the present invention include systems and methods for ball tracking. An identification processor may be coupled to a ball and may generate wireless signals as the ball is moving. At least three triangulation antennas may be distributed at different locations within an event venue. Such triangulation antennas may receive the wireless signals from the identification processor in real-time. Such signals may be used to determine a real-time location of the ball within the event venue. A controller may then adjust a gimbal to point the camera at the determined real-time location of the ball.

Various embodiments may further include methods for ball tracking. Such methods may include broadcasting wireless signals from a ball as the ball is moving via an identification processor coupled to the ball, receiving the wireless signals via at least three triangulation antennas distributed at different locations within an event venue, determining a real-time location of the ball within the event venue based on the wireless signals received by each of the at least three triangulation antennas at the different locations, and adjusting a camera based on the determined real-time location of the ball.

DETAILED DESCRIPTION

Embodiments of the present invention include systems and methods for ball tracking. An identification processor may be coupled to a ball and may generate wireless signals as the ball is moving. At least three triangulation antennas may be distributed at different locations within an event venue. Such triangulation antennas may receive the wireless signals from the identification processor in real-time. Such signals may be used to determine a real-time location of the ball within the event venue. A controller may then adjust a gimbal to point the camera at the determined real-time location of the ball.

Figure 1:
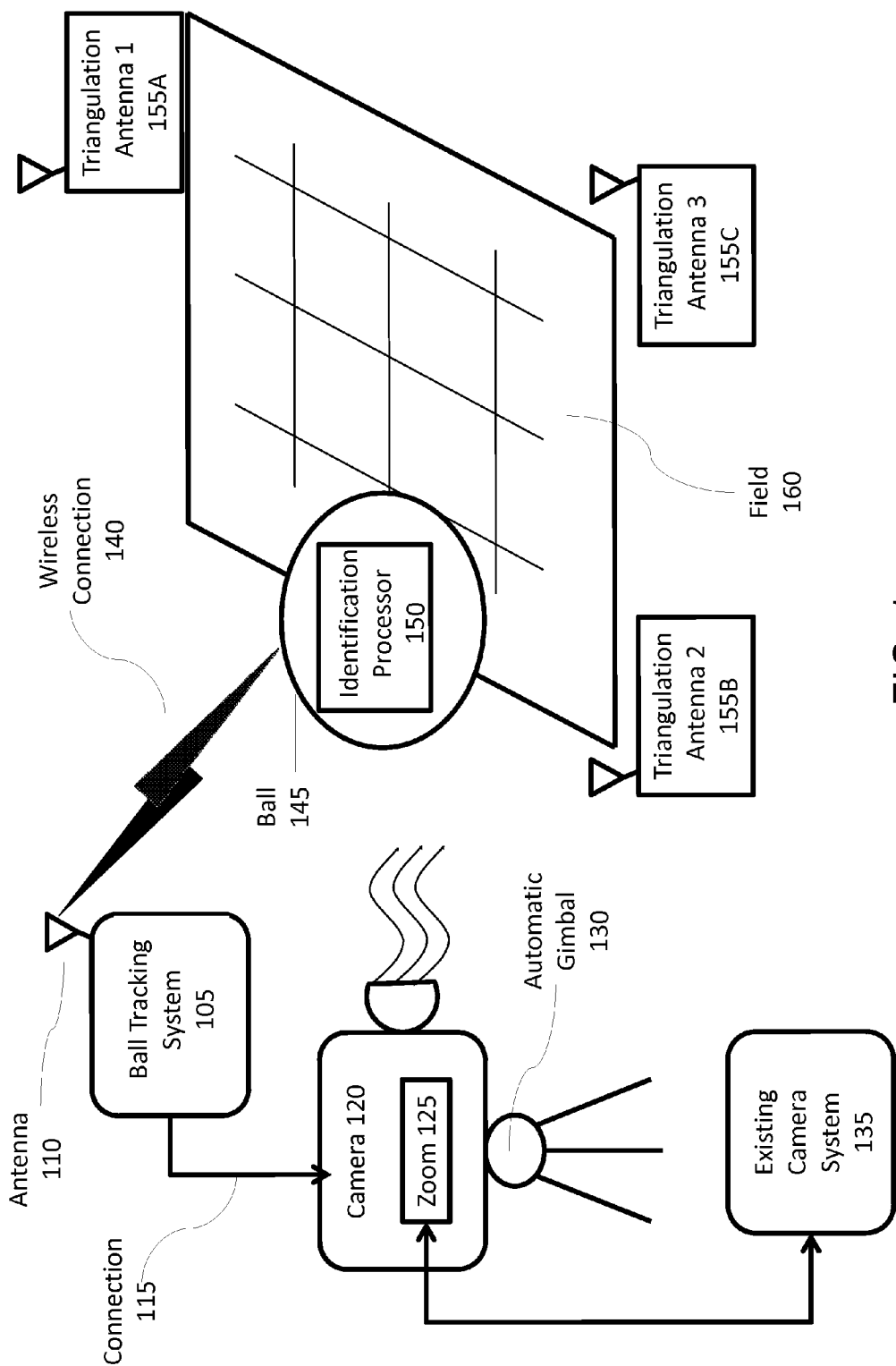
FIG. 1 illustrates an exemplary environment in which a system for ball tracking may be implemented.

FIG. 1 illustrates an exemplary environment in which a system for ball tracking may be implemented. As illustrated, the environment may include a ball tracking system 105 having an antenna 110 and a connection 115 to a camera 120 (with ability to zoom 125) on a gimbal 130. Such camera 120 may be part of an existing camera system 135. In addition, ball tracking system 105 may be connected via wireless connection 140 to a ball 145 with an identification processor 150. There may also be a plurality (at least three) of triangulation antennas 155A-C distributed at different locations around the event venue (e.g., field 160).

In an exemplary implementation, the ball 105 (and its onboard identification processor 150) may be in play on the field 160. As the ball 105 moves, the identification processor 150 may send out wireless signals, which may be received by the triangulation antennas 155A-C. Information regarding such wireless signals may be provided by triangulation antennas 155A-C to the ball tracking system 105, which may receive such information via antenna 110 over wireless connection 140. Based on the information from each of the at least three triangulation antennas 155A-C, a real-time location of the identification processor 150 (and ball 145) may be determined.

The ball tracking system 105 may provide the real-time location via connection 115 to camera 120 and/or automatic gimbal 130. Automatic gimbal 130 may reposition the camera 120 as needed to align the line-of-sight of the camera 120 with the determined real-time location of the ball 145. Further, camera 120 may adjust its zoom mechanism 125 to zoom in and focus on the determined real-time location of the ball 145. As such, the camera 120 may be able to automatically follow the ball 145 in real-time, regardless of the speed of play or player misdirection.

Figure 2:
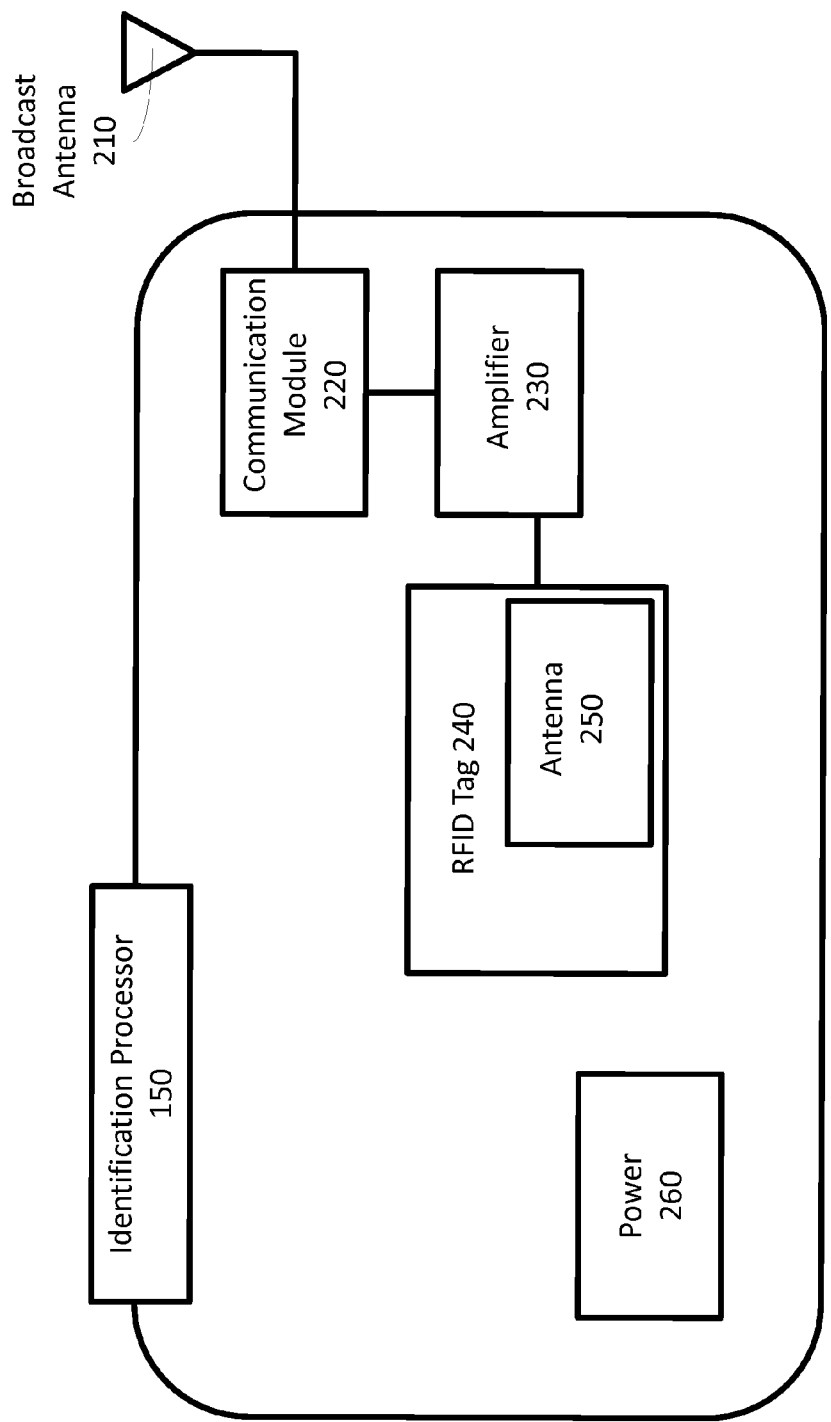
FIG. 2 illustrates an exemplary identification processor that may be used in a system for ball tracking.

FIG. 2 illustrates an exemplary identification processor 150 that may be used in a system for ball tracking. Such identification processor 150 may include a broadcast antenna 210, a communication module 220, an amplifier 230, radio frequency identification (RFID) tag 240 (with associated antenna 250), and power source 260.

The RFID tag 240 allows for unique identification of the ball 145. As the ball 145 is moving, the ball 145 (as identified by RFID tag 240) may be broadcast a signal, which is amplified by amplifier 230 and sent via communication module 220 and broadcast antenna 210 to the triangulation antennas 155A-C around the field. Power source 260 may include any type of battery or portable power storage known in the art.

Figure 3:
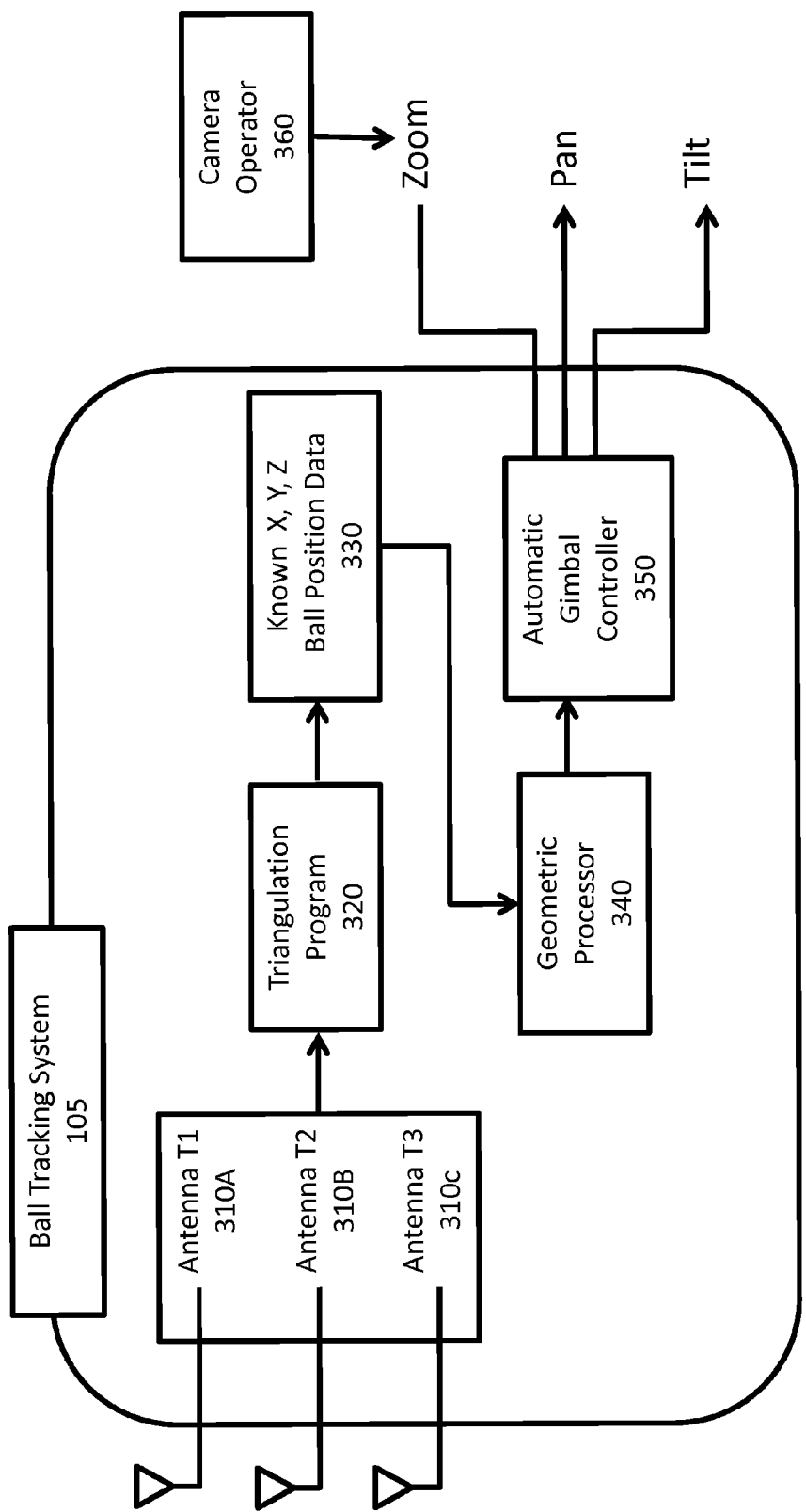
FIG. 3 illustrates an exemplary ball tracking system.

FIG. 3 illustrates an exemplary ball tracking system 105. Such ball tracking system 105 may include one or more antennas 310A-C, triangulation program 320, known X,Y,Z ball position data, geometric processor 340, automatic gimbal controller 350, and camera operator 360 (which may be integrated or separate from ball tracking system 105).

In some embodiments, ball tracking system 105 may have an antenna 310A-C corresponding to each of the triangulation antennas 155A-C on the field 160. Each antenna 310 may receive information regarding the real-time wireless signals as received by the associated triangulation antenna 155. Such information may be provided to triangulation program 320, which uses known triangulation techniques to identify a real-time X,Y,Z location of the ball on the field 160. Such data may be provided and maintaining in a database for known X,Y,Z ball position data 330. Such data may further be provided to geometric processor 340, which may use known interpolation techniques to determine the current location (including a determined path) of the ball 145 so as to determine where to point the camera 120. Such real-time location information may therefore be provided to automatic gimbal control 350, which may then reposition the camera 120 to keep the ball 145 within a line-of-sight or field of view. In addition, the real-time location information may also be provided to an associated camera operator 360, which may control zooming functions. Additional camera control options (e.g., panning, tilting) may also be controlled based on the real-time location information.

Figure 4:
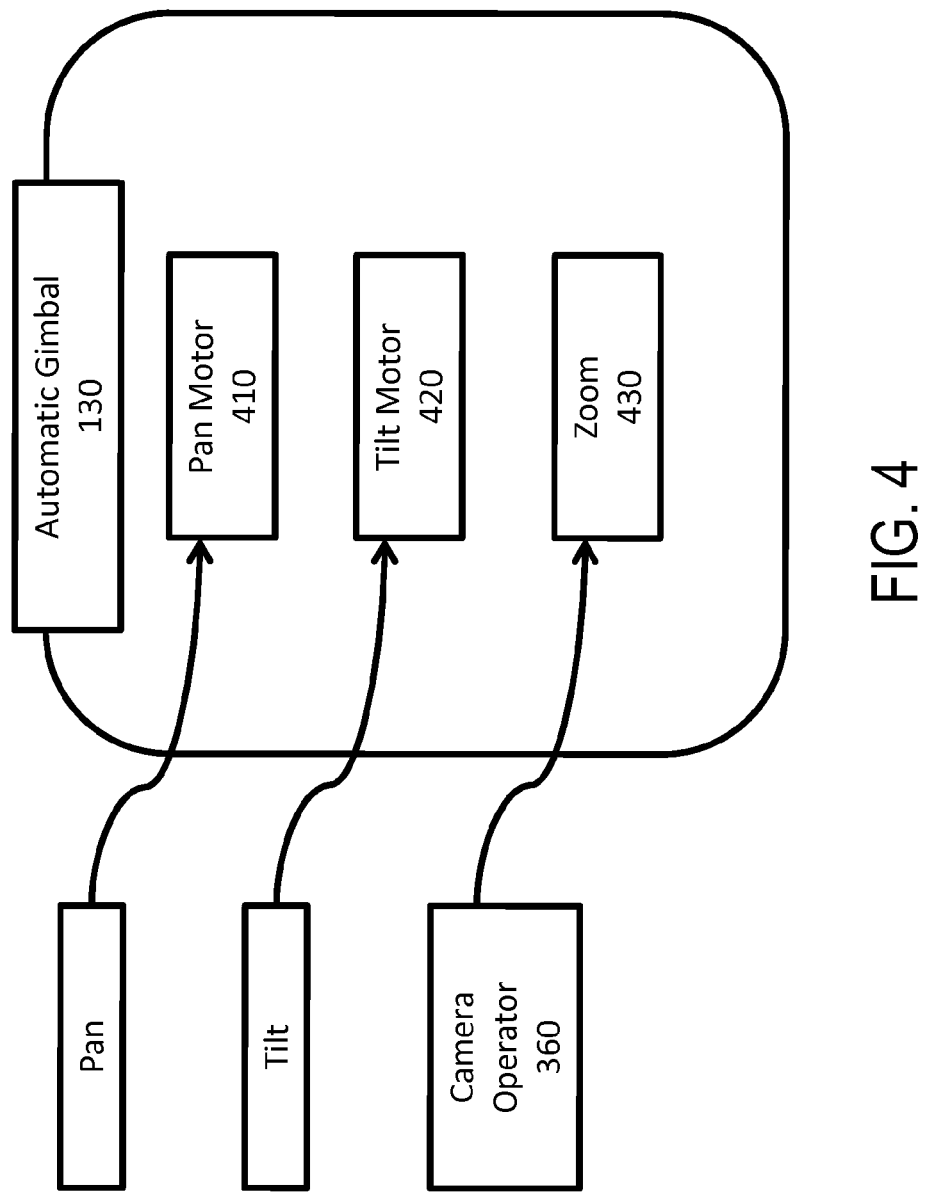
FIG. 4 illustrates an exemplary automatic gimbal that may be used in a system for ball tracking.

FIG. 4 illustrates an exemplary automatic gimbal 130 that may be used in a system for ball tracking. Automatic gimbal 130 may include a pan motor 410, a tilt motor 420, and zoom controls 430. Pan motor 410 allows for panning views of the field 160, while tilt motor 420 allows for tilting of the camera 120, and zooming controls 430 may allow for the camera shot to zoom in or out. As noted above, zooming controls 430 may be already part of a camera operator 360 that may be part of or associated with an existing camera system 135.

Figure 5:
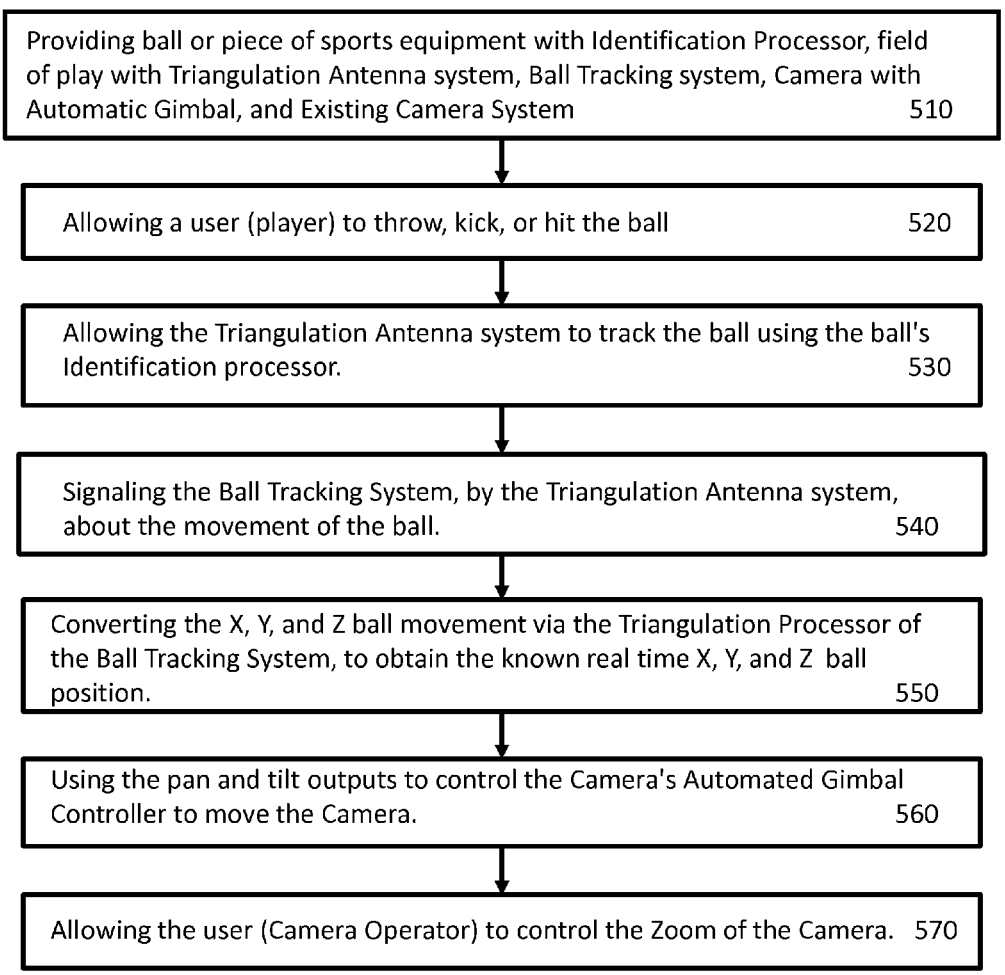
FIG. 5 is a flowchart illustrating an exemplary method for ball tracking.

FIG. 5 is a flowchart illustrating an exemplary method for ball tracking. The method of FIG. 5 (and other methods discussed herein) may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in the method of FIG. 5 (and other methods discussed herein), as well as the order thereof, are exemplary and may include various alternatives, equivalents, or derivations thereof including but not limited to the order of execution of the same.

In step 510, a ball 145 (or other piece of sports equipment) may be provided with an identification processor 150, and the field 160 may be provided with at least three triangulation antennas 155 A-C distributed at different locations around the field 160. In addition, a ball tracking system 105 may be provided that allows for control of camera 120 and/or automatic gimbal 130.

In step 520, the ball 145 is put into play on the field 160. As such, ball 145 may be thrown, kicked, hit, or otherwise made to move around the field 160. In step 530, the identification processor 150 associated with the ball 145 may broadcast wireless signals that may be detected by triangulation antennas 155A-C. In step 540, the ball tracking system 105 may be provided with information regarding the wireless signals by the triangulation antennas 155A-C in real-time. In step 550, the ball tracking system 105 may use such signal information to triangulate the real-time position of the ball 145. Such real-time position may be expressed as X,Y,Z ball position data within the field 160.

In step 560, the real-time position information of the ball 145 may be used to generate commands to camera 120 and/or automatic gimbal 130. Camera 120 and/or automatic gimbal 130 may be programmed to respond to the real-time position of the ball 145 by performing such actions as panning, tilting, and/or zooming. In optional step 570, a user or human camera operator may be allowed to control the zoom of the camera 120.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A system for ball tracking, the system comprising:
   an identification processor coupled to a ball, wherein the identification processor broadcasts wireless signals as the ball is moving;
   at least three triangulation antennas distributed at different locations within an event venue, wherein each of the at least three triangulation antennas receive the wireless signals from the identification processor;
   a camera controller that:
      determines a real-time location of the ball within the event venue based on the wireless signals received by each of the at least three triangulation antennas at the different locations, and adjusts a camera based on the determined real-time location of the ball, wherein the camera adjustment includes zooming in or zooming out to the determined real-time location of the ball.

2. The system of claim 1, further comprising an automatic gimbal executed by the processor to adjust the camera.

3. The system of claim 1, wherein the camera adjustment includes panning across the event venue.

4. The system of claim 1, wherein the camera adjustment includes tilting the camera.

5. The system of claim 1, wherein the identification processor includes a radio frequency identification tag that uniquely identifies the ball.

6. The system of claim 1, wherein the identification processor includes an amplifier to amplify the wireless signals.

7. The system of claim 1, wherein the camera controller determines a real-time location of the ball based on triangulation of the wireless signals received from the at least three triangulation antennas.

8. The system of claim 1, wherein the camera controller further determines a path of the ball based on interpolation.

9. A method for ball tracking, the method comprising:
broadcasting wireless signals from a ball as the ball is moving, wherein the wireless signals are broadcast by an identification processor coupled to the ball;
receiving the wireless signals via at least three triangulation antennas distributed at different locations within an event venue;
determining a real-time location of the ball within the event venue based on the wireless signals received by each of the at least three triangulation antennas at the different locations; and
adjusting a camera based on the determined real-time location of the ball, wherein the camera adjustment includes zooming in or zooming out to the determined real-time location of the ball.

10. The method of claim 9, wherein adjusting the camera comprises adjustment by an automatic gimbal.

11. The method of claim 9, wherein the camera adjustment includes panning across the event venue.

12. The method of claim 9, wherein the camera adjustment includes tilting the camera.

13. The method of claim 9, wherein the ball is uniquely identified by a radio frequency identification tag.

14. The method of claim 9, wherein the identification processor includes an amplifier to amplify the wireless signals.

15. The method of claim 9, wherein determining the real-time location of the ball is based on triangulation of the wireless signals received from the at least three triangulation antennas.

16. The method of claim 9, wherein determining the real-time location of the ball further comprises determining a path of the ball based on interpolation.

* * * * *